United States Patent
Paul et al.

(10) Patent No.: US 8,214,633 B2
(45) Date of Patent: *Jul. 3, 2012

(54) IMPLEMENTING A DIAGNOSTIC OR CORRECTION BOOT IMAGE OVER A NETWORK CONNECTION

(75) Inventors: Chakkalamattam Jos Paul, Austin, TX (US); Marc-Arthur Pierre-Louis, Round Rock, TX (US); Javier A. Guajardo, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 316 days.

This patent is subject to a terminal disclaimer.

(21) Appl. No.: 12/418,930

(22) Filed: Apr. 6, 2009

(65) Prior Publication Data
US 2009/0217025 A1    Aug. 27, 2009

Related U.S. Application Data

(63) Continuation of application No. 11/386,635, filed on Mar. 22, 2006, now Pat. No. 7,519,807.

(51) Int. Cl.
*G06F 9/00* (2006.01)
(52) U.S. Cl. ............................... 713/2; 713/1; 713/100
(58) Field of Classification Search .................. 713/1, 2, 713/100; 717/171, 176
See application file for complete search history.

(56) References Cited

U.S. PATENT DOCUMENTS

| | | | |
|---|---|---|---|
| 5,390,324 A | 2/1995 | Burckhartt et al. | |
| 5,455,933 A | 10/1995 | Schieve et al. | |
| 5,596,711 A | 1/1997 | Burckhartt et al. | |
| 5,678,002 A | 10/1997 | Fawcett et al. | |
| 5,680,547 A | 10/1997 | Chang | |
| 5,732,268 A | 3/1998 | Bizzarri | |
| 5,815,652 A | 9/1998 | Ote et al. | |
| 5,948,101 A | 9/1999 | David et al. | |
| 5,956,475 A | 9/1999 | Burckhartt et al. | |
| 6,044,476 A | 3/2000 | Ote et al. | |
| 6,101,617 A | 8/2000 | Burckhartt et al. | |
| 6,189,114 B1 | 2/2001 | Orr | |
| 6,317,826 B1 | 11/2001 | McCall et al. | |
| 6,330,690 B1 | 12/2001 | Nouri et al. | |
| 6,438,711 B2 | 8/2002 | Woodruff | |
| 6,560,706 B1 | 5/2003 | Carbajal et al. | |
| 6,697,962 B1 | 2/2004 | McCrory et al. | |
| 7,007,077 B1 * | 2/2006 | Shinohara et al. | 709/220 |
| 7,065,640 B2 | 6/2006 | Paul et al. | |
| 7,519,807 B2 * | 4/2009 | Paul et al. | 713/2 |

* cited by examiner

*Primary Examiner* — Paul Yanchus, III
(74) *Attorney, Agent, or Firm* — Yee & Associates, P.C.; Jeffrey S. LaBaw

(57) ABSTRACT

The present invention is directed to a system that initiates specific maintenance and diagnostic boot images on remote computers. The system is used to select a particular remote device over a network. A particular new boot image is also selected, and that boot image is tailored to operate a maintenance or diagnostic function on the target machine. The new boot image is downloaded to the target, and the target is rebooted with the new boot image. The new boot image is selected from other specific boot images. Upon reboot, the new boot image performs the diagnostic or maintenance routines on the remote target machine. At some predetermined point, the original boot image is swapped back, and the machine rebooted once again. This returns the machine to its original image.

20 Claims, 1 Drawing Sheet

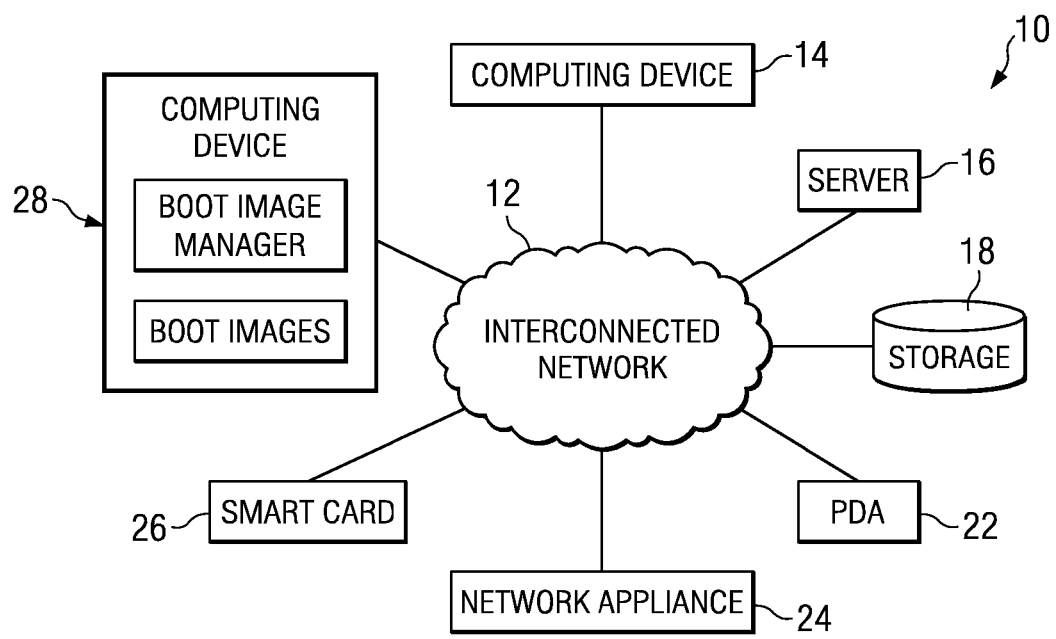
FIG. 1
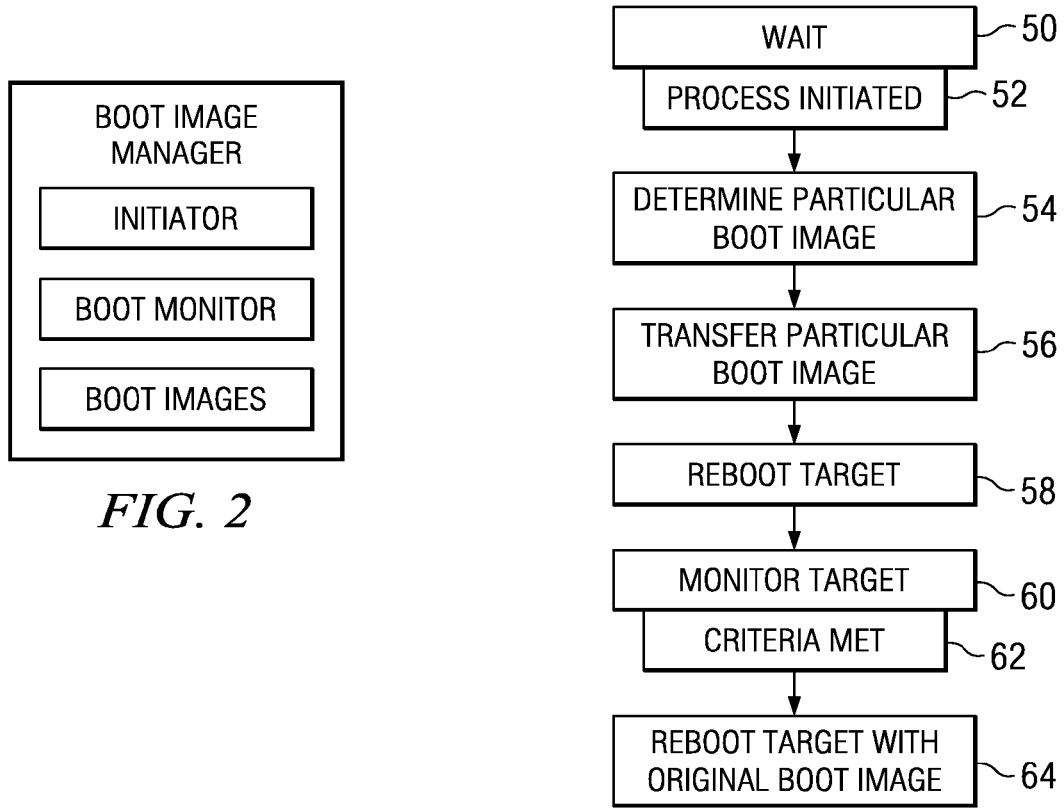
FIG. 2
FIG. 3

IMPLEMENTING A DIAGNOSTIC OR CORRECTION BOOT IMAGE OVER A NETWORK CONNECTION

This application is a continuation of application Ser. No. 11/386,635, filed Mar. 22, 2006, status issued on Apr. 14, 2009 (U.S. Pat. No. 7,519,807), which in turn is a continuation of application Ser. No. 09/975,248, filed Oct. 11, 2001, status issued on Jun. 20, 2006 (U.S. Pat. No. 7,065,640).

TECHNICAL FIELD OF THE INVENTION

The present invention relates to implementing specific bootable operating system (OS) images to a network connected computing device. In particular the invention relates to directing the reboot of a computing device using a boot image that diagnoses or corrects defects from a remote location.

BACKGROUND OF THE INVENTION

In many typical networked computing devices, a remote administrator has no means to perform automatic client hardware maintenance without touching the client machine. These tasks include flashing a BIOS, or boot sector repair for computing devices.

Some network machines can have maintenance performed remotely from a server, or may have control taken from them remotely. However, the remote nature of the operation is typically only done while still running under a typical boot image. Thus, some maintenance functions cannot be performed through this remote action.

Other problems may include the remote diagnostics of machines, and such diagnostics require the operation of the machine apart from the typical boot image. Again, these actions can only take place at the client machine.

These problems may include the deterioration of physical parts of electromagnetic storage media associated with them. When this happens, an that operates on any of them may not be able to handle the proper correction techniques associated with that problem. Alternatively, the systems themselves may lack the requisite capacity even to determine if any inherent problems exist or are about to happen.

In this manner, the typical prior art does not allow for flexible processing schedules along with dealing with ever-changing security rejection issues. Many other problems and disadvantages of the prior art will become apparent to one skilled in the art after comparing such prior art with the present invention as described herein.

SUMMARY OF THE INVENTION

Aspects of the invention are found in a system that aids in the diagnostic and maintenance functions of remote computing devices. The remote computing devices are coupled to a network and run under a boot image.

The system contains some initiation mechanism, which allows for the selection of a particular remote computing device. The initiation mechanism may be user interface software, where a human operator can select the particular remote computing device. Additionally, the initiation mechanism may be a remote diagnostic program that initiates the system when performance criteria of the target systems hit a predetermined threshold.

Further, the initiator may be some temporal based function, such that an administrator may selectively operate the system through predetermined controls. An example may be a ▓chron▓ command in a UNIX-type operating system, or through scheduling functions in a stand alone maintenance manager. In these cases, the administrator may set up a schedule to run the system based on temporal or other considerations.

In any case, when a particular remote computing device is selected, a particular different boot image is also selected. The boot image may be selected from one or more images, and these images may be stored remotely or local relative to the system.

In any case, the system directs the new boot image to the particular remote computing device. At the completion of the download, the remote computing device is primed for rebooting under the new boot image.

The remote computing device is rebooted, and the new maintenance boot image runs on the remote computing device. One should note that a maintenance boot image might also include those boot images that perform diagnostic functions as well. The original boot image may be stored locally on the remote computing device. Alternatively, it may be stored at another computing device coupled to the remote computing device while the maintenance boot image controls the remote computing device.

The maintenance boot image is tailored to run diagnostic or maintenance functions. Each specific maintenance boot image can be tailored to perform different functions on the remote computing device. In this manner, the selection of the appropriate boot image specifies the diagnostic and maintenance chores for the remote computing device.

The system monitors the progress of the remote computing device running under the maintenance boot image. At some specified juncture, the maintenance boot image is swapped with the original boot image. Thus, upon reboot, the remote computing device will return to its original operating boot image.

The system monitors the remote computing device. At the proper time, a second reboot is initiated for the remote computing device. This may occur when the maintenance boot image signals the system that the functional aspects of the maintenance boot image have been achieved.

As such, a system for initiating the remote operation of diagnostic and maintenance boot images for remote computing devices is envisioned. Other aspects, advantages and novel features of the present invention will become apparent from the detailed description of the invention when considered in conjunction with the accompanying drawings.

BRIEF DESCRIPTION OF THE DRAWINGS

FIG. 1 is a schematic diagram of a typical network of data processing systems that may employ the current invention.

FIG. 2 is a schematic block diagram of an embodiment of the system of 5 FIG. 1.

FIG. 3 is a flow diagram of a possible operation of the system of Figure

DETAILED DESCRIPTION OF THE DRAWINGS

FIG. 1 is a schematic diagram of a typical network of data processing systems that may employ the current invention. Any of the data processing systems of FIG. 1 may implement the present invention, or may be operated on by the present invention. A distributed data processing system contains an interconnected network 12. The network 12 provides communications link between all the various devices and computers connected within the distributed processing system 10. The network 12 may include permanent connections, 10 such as wire or fiber optic cables, or other types of connections such as wireless, satellite, or infrared network technology.

The network 12 may operate under a number of different operating schemes. Communications may flow between the associated components of the distributed processing system 10 under various protocols, including TCP/IP. The network 12 may also be indicative of several interconnected networks, such as the Internet.

The network 12 connects a computing device 14 and a server 16. Additionally, a storage unit 18 connects to the network 12, thus allowing the computing device 14 and the server 16 to communicate with and store data to and from the storage unit 18.

Additional computing components connected to the network 12 may include a personal digital assistant 22 and a remote network appliance 24. Additionally, an individual user may carry a so-called smart card 26. The smart card may contain sufficient data and/or processing capabilities to allow connection to and communication with other components of the distributed data processing system 10.

One should note that the distributed data processing system might also include numerous different types of networks. Any one of, or any combination of, for example, an intranet, a local area network (LAN), a wide area network (WAN), or an aggregation of units may connect to each other in a fashion. Any of the connections may be wireless in nature.

If using the network in a secure fashion, the network may be local to the individual clients. In another manner, such a secure network may be implemented upon a public network using various security protocols, thus creating a virtual secure network (VSN) molded from the public network infrastructure. In addition, the present invention may be implemented on a variety of hardware and software platforms, as described above.

Assume that any of the devices attached to the network 12 may, in the course of their operation, encounter difficulties. In an embodiment of the invention, an operations device 28 is coupled to the network. The operations server contains server routines and boot images, and thus is able to reboot any of the devices associated with the distributed network 10 in a manner that diagnoses and corrects problems or perform maintenance.

The invention is accomplished by downloading a specific new boot image, rebooting, and having the target device perform the functions through the new boot image. Upon completion, the original image swaps back and the target device initiates another reboot process. This allows the target device to return to the original operations state with the original boot image that it was previously running on.

In this case, assume that the computer 14 is running a particular operating system through a boot image. The operations server may remotely diagnose or treat problems on the computer 14 through network interaction. Alternatively, the process begins through human intervention, or through an automated process such as a timed maintenance program or a diagnostic program running either local to the device 14 or over the network.

In the boot image manager, the system selectively picks the target client and/or the target action. The operations server then initiates a remote boot of the target machine with a specifically chosen boot image.

The specific boot image is delivered to the target machine via network interaction, and the target is then rebooted. The reboot may be initiated either locally at the target machine or over the network from the operations device or from another remotely located device.

When the target undergoes the reboot, a new boot image, as specified by the operator, is initiated in the target machine. This makes the target machine operate in a specific manner, as specified by the new boot image. The new boot image may take many forms, and perform varied tasks. For example, the boot image may perform diagnostics on the target machine hardware and software configuration. In this manner, such actions as a disk boot sector repair after an infection may be performed. Alternatively, specialized boot images may be designed so that complex interactions between the hardware may be analyzed more thoroughly, and in a way previously unable in the original boot image.

In one embodiment of the invention, the specialized boot process runs to completion. A software process (daemon) operating on the operations server may monitor the process on the target machine. Upon completion of the diagnostic or maintenance boot operation, the daemon senses condition and initiates a switch of the client back to operating under the original boot image.

The daemon may perform in an active or passive manner. In an active manner, the daemon would monitor the process, perhaps by polling the boot image for update information. In this case, the operations server would be an active participant in the process, and may be able to supply added data or specific subroutines to run on the target machine as necessary.

In the passive mode, the daemon would simply await the completion signal from the maintenance boot image. In either case the daemon signals the completion of the maintenance or diagnostic action of the specialized boot image to the operations server.

The operations server may then direct that the original boot image be swapped back into the target machine. Upon another reboot, the target machine operates in its usual operational manner. The reboot may also be initiated remotely or at the target machine.

The operations server may contain several boot images for the target machines. These boot images may be for boot images to allow the machines to operate in a normal fashion. Additionally, it may contain the specific maintenance and/or diagnostic boot images.

In other embodiments, any or all these boot images may be stored in various places where the operations server might access them. In this manner, the storage of the actual boot images may range across the interconnected network system. Additionally, specific functional units of the boot image manager may exist across several devices and work in conjunction with one another.

Also, the various components of the boot image manager may be spread among the various interconnected devices. One device may contain the actual boot detection and/or initiation mechanisms, and another may contain the portion z that monitors the progress of the remote machine booted with the new maintenance boot image.

As such, the system may direct the switching back and forth of maintenance/diagnostic and operational images. This allows for ranging effects on the networked system.

In one hypothetical situation, assume that some as yet unidentified virus has struck computer 14. The system administrator may not know the extent of the infection and/or damage accorded by the virus. Upon learning of the virus, the administrator can easily diagnose each machine, and possibly fix damage caused on it through the remote interaction. As such, highly specialized boot images may be developed for other highly specialized diagnostic and/or maintenance functions, and these may be run easily on a timetable. Additionally, this functionality allows for ease in maintenance and diagnostic functions across several networked machines.

FIG. 2 is a schematic block diagram of an embodiment of the system of FIG. 1. The system contains an initiator, a monitoring interface, and a set of client boot images. An action is specified on the target machine through the initiator. As noted, the initiator may take many forms, including a user interface, a remote diagnostic monitor, or a maintenance program.

In the case where the diagnostic alert software initiates the boot image swap, the diagnostic alert software may monitor the computational ❊health❊ of the client machines. When the ❊health❊ of a particular client target falls below a particular level, such as CPU SPEED memory speed, or other such parameter, it may automatically initiate the maintenance boot cycle as previously described. In this manner, the system may operate based on predetermined criteria of the computational ❊health❊ of the target machine As noted previously, any or all the functional units of FIG. 2 may exist within one system on the network connection. Alternatively, they may exist across several of the interconnected systems.

FIG. 3 is a flow diagram of a possible operation of the system of claim 1. In a block 50, the system awaits initiation. In a block 52, the system is initiated to perform a maintenance or diagnostic function on a particular target machine. As noted before, the initiation may be by manual or by automatic monitoring means. In a block 54, the particular boot image is located for the target machine based upon the function to be performed with the target machine. In a block 56, the boot image is transferred to the target machine.

In a block 58, the target machine is rebooted, and the sensing software determines the status of the process in a block 60. In a block 62, the sensing software of the server has determined that the boot image has met its ending criteria, such as completing its maintenance task. In a block 64, the target machine directs the reboot of the target device under the original boot image.

Thus, architecture for dynamically switching operating systems for remote client maintenance and repair is described. It should be noted that such an architecture might be implemented with a computing device. The computing device may be a general purpose or specialized computing device. It should also be noted that the architecture might be implemented as software run on the computing device and within such components as magnetic media or computer memory associated with the computing device or within transmission media operating between computing devices.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. A computing system aiding in maintenance functions of a remote computing device, the remote computing device coupled to a network and running under a first boot image, the computing system comprising a hardware data processor and memory, and further comprising:
   a download director, communicatively coupled to a user interface of the computing system, that controls a download of a maintenance boot image to the remote computing device via the network;
   a first reboot director that initiates a first reboot process of the remote computing device to reboot the remote computing device with the maintenance boot image and perform maintenance functions included with the maintenance boot image;
   a monitoring director that monitors the remote computing device for an occurrence of a predetermined event associated with the maintenance boot image being run by the remote computing device while the remote computing device is running the maintenance boot image;
   a second reboot director that initiates a second reboot process of the remote computing device to reboot the remote computing device using the first boot image upon the occurrence of the predetermined event, wherein the predetermined event is a signal from the remote computing device indicating that function of an operational mode associated with the maintenance boot image has been completed; and
   a process initiator that selects a specific operational mode of the remote computing device, wherein the reboot of the remote computing device is an initialization boot process that initializes the remote computer device in a manner as if the remote computing device was initially powered-up and executing a boot image from a boot device.

2. The system of claim 1, wherein the selection of a specific operational mode results in a download of a particular new boot image from among a plurality of boot images.

3. The system of claim 2, wherein each of the plurality of boot images is operable to perform a particular maintenance or diagnostic task on the remote computing device.

4. The system of claim 2 wherein the plurality of boot images reside on a remote storage media.

5. The system of claim 1 wherein the process initiator is a user interface, and an operator specifies the remote computing device.

6. The method of claim 1, wherein the operation monitor polls the maintenance boot image for update information.

7. The method of claim 6, wherein the operation monitor provides at least one of additional data and a subroutine to the maintenance boot image.

8. A computing system aiding in maintenance functions of a remote computing device, the remote computing device coupled to a network and running under a first boot image, the computing system comprising a hardware data processor and memory, and further comprising:
   a download director, communicatively coupled to a user interface of the computing system, that controls a download of a maintenance boot image to the remote computing device via the network;
   a first reboot director that initiates a first reboot process of the remote computing device to reboot the remote computing device with the maintenance boot image;
   a monitoring director that monitors the remote computing device for an occurrence of a predetermined event associated with the maintenance boot image being run by the remote computing device to perform a maintenance function on the remote computing device;
   a second reboot director that initiates a second reboot process of the remote computing device to reboot the remote computing device using the first boot image upon the occurrence of the predetermined event, wherein the predetermined event is a signal from the remote computing device indicating that function of an operational mode associated with the maintenance boot image has been completed; and
   a process initiator that selects a specific operational mode of the remote computing device, wherein the process initiator is an independent diagnostic program, the independent diagnostic program initiating a selection of the remote computing device based upon specified criteria, the specified criteria of the remote computing device being monitored by the independent diagnostic program.

9. A method for maintaining a remote computing device by a first computing device, the remote computing device coupled to a network and running under a first boot image, the method comprising automated computer implemented steps of:

downloading, by the first computing device, a maintenance boot image to the remote computing device via the network;

initiating, by the first computing device, a first reboot process of the remote computing device to reboot the remote computing device with the maintenance boot image and perform a maintenance function included with the maintenance boot image;

monitoring, by the first computing device, the remote computing device for an occurrence of a predetermined event associated with the maintenance boot image being run by the remote computing device while the remote computing device is running the maintenance boot image;

initiating, by the first computing device, a second reboot process of the remote computing device to reboot the remote computing device using the first boot image upon the occurrence of the predetermined event, wherein the predetermined event is a signal from the remote computing device indicating that function of an operational mode associated with the maintenance boot image has been completed; and selecting a specific operational mode of the remote computing device, wherein the reboot of the remote computing device is an initialization boot process that initializes the remote computer device in a manner as if the remote computing device was initially powered-up and executing a boot image from a boot device.

10. The method of claim 9, wherein the step of selecting a specific operational mode results in downloading a particular new boot image from among a plurality of boot images.

11. The method of claim 10, wherein each of the plurality of boot images is operable to perform a particular maintenance or diagnostic task on the remote computing device.

12. The method of claim 10 wherein the plurality of boot images reside on a remote storage media.

13. The method of claim 9 wherein the step of selecting is performed by a user through a user interface, and the user specifies the remote computing device.

14. The method of claim 9 wherein the step of selecting is performed by a software program.

15. A computer program product comprising computer usable storage device having instructions stored thereon for maintaining a remote computing device by a first computing device, the remote computing device coupled to a network and running under a first boot image, the instructions comprising:

instructions for downloading, by the first computing device, a maintenance boot image to the remote computing device via the network;

instructions for initiating, by the first computing device, a first reboot process of the remote computing device to reboot the remote computing device with the maintenance boot image and perform maintenance functions included with the maintenance boot image;

instructions for initiating, by the first computing device, a second reboot process of the remote computing device to reboot the remote computing device using the first boot image upon an occurrence of a predetermined event, wherein the predetermined event is a signal from the remote computing device indicating that function of an operational mode associated with the maintenance boot image has been completed;

instructions for selecting a specific operational mode of the remote computing device, wherein the reboot of the remote computing device is an initialization boot process that initializes the remote computer device in a manner as if the remote computing device was initially powered-up and executing a boot image from a boot device; and instructions for monitoring the remote computing device for the occurrence of the predetermined event while the remote computing device is running the maintenance boot image.

16. The computer program product of claim 15, the instructions for selecting a specific operational mode resulting in downloading a particular new boot image from among a plurality of boot images.

17. The computer program product of claim 16, wherein each of the plurality of boot images is operable to perform a particular maintenance or diagnostic task on the remote computing device.

18. The computer program product of claim 16 wherein the plurality of boot images reside on a remote storage media.

19. The computer program product of claim 15 wherein the instructions for selecting allow for the interaction of a user, and the user specifies the remote computing device.

20. The computer program product of claim 15 wherein the instructions for selecting are responsive to signals from a software program.

* * * * *